United States Patent
You et al.

(10) Patent No.: US 9,180,904 B2
(45) Date of Patent: Nov. 10, 2015

(54) APPARATUS AND METHOD FOR CONTROLLING AUTOMATIC STEERING OF VEHICLE

(71) Applicant: Hyundai Motor Company, Seoul (KR)

(72) Inventors: Byung Yong You, Gyeonggi-do (KR); Tae Sung Choi, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/220,480

(22) Filed: Mar. 20, 2014

(65) Prior Publication Data

US 2015/0158526 A1    Jun. 11, 2015

(30) Foreign Application Priority Data

Dec. 9, 2013  (KR) .......................... 10-2013-0152437

(51) Int. Cl.
*B62D 6/04* (2006.01)
*B62D 1/28* (2006.01)
*B62D 15/02* (2006.01)

(52) U.S. Cl.
CPC .............. *B62D 1/28* (2013.01); *B62D 15/025* (2013.01)

(58) Field of Classification Search
None
See application file for complete search history.

(56) References Cited

U.S. PATENT DOCUMENTS

| | | | |
|---|---|---|---|
| 5,938,707 A * | 8/1999 | Uehara | 701/41 |
| 6,092,619 A * | 7/2000 | Nishikawa et al. | 180/446 |
| 6,170,600 B1 * | 1/2001 | Shimizu | 180/446 |
| 6,343,247 B2 * | 1/2002 | Jitsukata et al. | 701/28 |
| 6,738,705 B2 * | 5/2004 | Kojima et al. | 701/96 |
| 7,925,415 B2 * | 4/2011 | Kudo | 701/96 |
| 8,095,266 B2 * | 1/2012 | Kim | 701/36 |
| 2002/0013647 A1 * | 1/2002 | Kawazoe et al. | 701/41 |
| 2002/0099481 A1 * | 7/2002 | Mori | 701/23 |
| 2005/0043882 A1 * | 2/2005 | Takazawa | 701/200 |
| 2006/0030987 A1 * | 2/2006 | Akita | 701/41 |
| 2006/0080016 A1 * | 4/2006 | Kasahara et al. | 701/41 |
| 2006/0235598 A1 * | 10/2006 | Kudo | 701/96 |
| 2007/0191997 A1 * | 8/2007 | Isaji et al. | 701/1 |
| 2009/0125204 A1 | 5/2009 | Kudo | |
| 2009/0153360 A1 | 6/2009 | Kim | |
| 2009/0194350 A1 * | 8/2009 | Rattapon et al. | 180/169 |
| 2009/0216405 A1 * | 8/2009 | Kudo | 701/41 |
| 2009/0287376 A1 * | 11/2009 | Aso | 701/42 |
| 2010/0106356 A1 * | 4/2010 | Trepagnier et al. | 701/25 |
| 2012/0283910 A1 * | 11/2012 | Lee et al. | 701/41 |
| 2012/0283912 A1 * | 11/2012 | Lee et al. | 701/41 |
| 2013/0060413 A1 * | 3/2013 | Lee et al. | 701/23 |
| 2013/0060414 A1 * | 3/2013 | Lee et al. | 701/23 |

FOREIGN PATENT DOCUMENTS

| | | | |
|---|---|---|---|
| JP | 2009096402 A | 5/2009 | |
| KR | 10-2009-0062135 A | 6/2009 | |

(Continued)

*Primary Examiner* — Mussa A Shaawat

(74) *Attorney, Agent, or Firm* — Mintz Levin Cohn Ferris Glovsky and Popeo, P.C.; Peter F. Corless

(57) ABSTRACT

An apparatus and a method for controlling automatic steering of a vehicle are provided. The apparatus includes a global positioning system (GPS) that is configured to detect a current location of the vehicle. In addition, a controller is configured to detect a curvature of a road that corresponds to the current location of the vehicle, detect a road type based on the curvature, and set a plurality of target points to adjust steering of the vehicle.

12 Claims, 4 Drawing Sheets

(56) References Cited

FOREIGN PATENT DOCUMENTS

| KR | 10-2010-0120381 A | 11/2010 |
| KR | 10-2012-0022305 | 3/2012 |
| KR | 10-2012-0094566 | 8/2012 |
| KR | 10-2013-0068268 | 6/2013 |
| KR | 10-2013-0096068 A | 8/2013 |

* cited by examiner

APPARATUS AND METHOD FOR CONTROLLING AUTOMATIC STEERING OF VEHICLE

CROSS-REFERENCE TO RELATED APPLICATION

This application is based on and claims priority from Korean Patent Application No. 10-2013-0152437, filed on Dec. 9, 2013, in the Korean Intellectual Property Office, the disclosure of which is incorporated herein in its entirety by reference.

BACKGROUND

1. Field of the Invention

The present invention relates to an apparatus and a method for controlling automatic steering of a vehicle, and more particularly, to an apparatus and a method for controlling automatic steering of a vehicle, for setting two target points in a driving direction of a vehicle similar to a driving pattern of a driver while the vehicle is driven on a road to control automatic steering of the vehicle.

2. Description of the Prior Art

In general, automatic steering control of a vehicle adopting an intelligent safety system including a known lane keeping assist system (LKAS) or other automatically steered and driven vehicles using known technologies is achieved by periodically transmitting an escape distance and an escape angle while the vehicle is driven as a feedback and using the escape distance and the escape angle to control the vehicle. The escape distance used for automatic steering is a vertical direction distance closest to a reference path from a reference point of a vehicle and refers to a degree by which the vehicle escapes (e.g., steers or travels away from) from the reference path in a transverse direction. In addition, the escape angle is an angle between a driving direction of a vehicle and a tangent vector direction of the reference path and refers to a degree by which an angle of the vehicle escapes from the reference path. Such a conventional automatic driving vehicle is configured to perform automatic driving by receiving and correcting the escape distance and the escape angle as a feedback.

However, vehicles that adopt a known automatic steering control system are configured to correct a vehicle escape distance and escape angle by applying a preset reference to a vehicle using the aforementioned technologies. There are driving patterns, that is, drivers gaze into the distance during high speed driving on a straight road or during curve road driving. However, the aforementioned conventional automatic steering control systems do not reflect these driver patterns.

SUMMARY

Accordingly, the present invention provides an apparatus and a method for controlling automatic steering of a vehicle, for setting two target points in a driving direction of a vehicle similar to a driving pattern of a driver while the vehicle is being driven on a road to control and adjust automatic steering of the vehicle. In addition, the present invention provides an apparatus and a method for controlling automatic steering of a vehicle, for setting distances between two target points set in a driving direction of the vehicle to be the about same to continuously control and adjust automatic steering of the vehicle.

In one aspect of the present invention, an automatic steering control apparatus of a vehicle may include: a global positioning system (GPS) configured to detect a current location of a vehicle, and a controller configured to detect a curvature of a road that corresponds to the current location of the vehicle, detect a type of road based on the curvature, and set a plurality of target points to adjust steering of the vehicle. The target point may correspond to an escape angle and an escape distance.

The controller may be configured to apply a preset weight to the escape angle and the escape distance to correspond to a driving state of the vehicle. In addition, the controller may be configured to set the escape angle as a short-distance target point and the escape distance as a long-distance target point based on the vehicle when the road is a substantially straight road. The controller may be configured to set the escape distance as a short-distance target point and the escape angle as a long-distance target point based on the vehicle when the road is a curved road.

In another aspect of the present invention, a method for controlling automatic steering of a vehicle may include: entering, by a controller, an automatic steering control mode based on an input, detecting, by the controller, a current location of the vehicle, detecting, by the controller, a curvature of a road that corresponds to the current location to detect a road type, setting, by the controller, a plurality of target points based on the road type, and adjusting, by the controller, steering of the vehicle based on the set target points.

The detection of the road type may include detecting, by the controller, the road as a curved road when the curvature of the road is equal to or greater than a threshold value, and detecting, by the controller, the road as a substantially straight road when the curvature of the road is less than the threshold value. The adjustment of the steering of the vehicle may include adjusting, by the controller, the steering of the vehicle by applying a preset weight to an escape angle and an escape distance as the target points to correspond to a driving state of the vehicle. The setting of the plural target points may include setting, by the controller, the escape angle as a short-distance target point and the escape distance as a long-distance target point based on the vehicle when the road is a substantially straight road, and setting the escape distance as a short-distance target point and the escape angle as a long-distance target point based on the vehicle when the road is a curved road.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
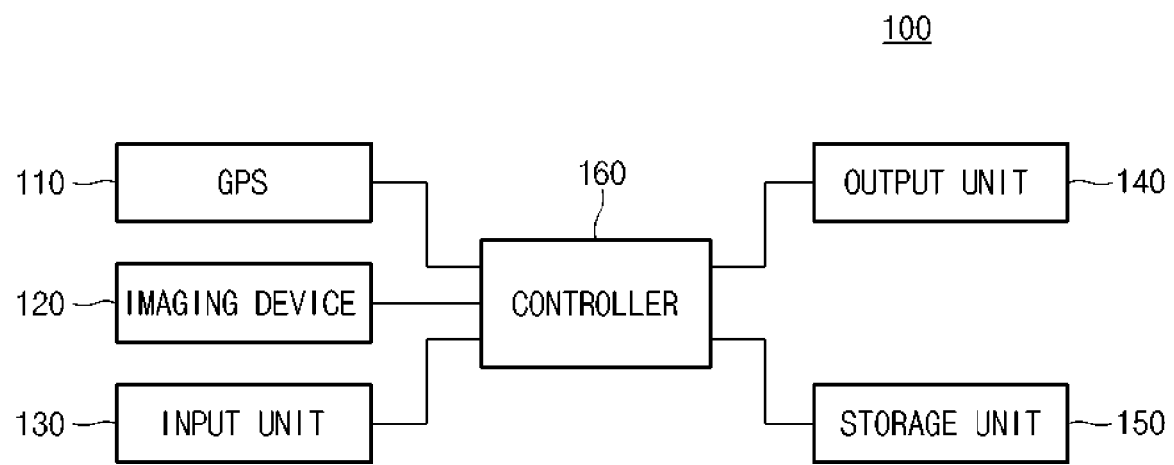
FIG. 1 is an exemplary block diagram illustrating a main structure of an automatic steering control apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings. With regard to the description of the exemplary embodiments of the present invention, technical features that are well known to those of ordinary skill in the art and are not directly associated with the present invention are not described here. In the description of the present invention, certain detailed explanations of related art are omitted for clarity when it is deemed that they may unnecessarily obscure the essence of the invention.

FIG. 1 is an exemplary block diagram illustrating a main structure of an automatic steering control apparatus 100 according to an exemplary embodiment of the present invention. Referring to FIG. 1, the automatic steering control apparatus 100 according to the present embodiment may include a global positioning system (GPS) 110, an imaging device 120 (e.g., a camera, a video camera, etc.), an input unit 130, an output unit 140, a storage unit 150, and a controller 160.

The GPS 110 may be configured to detect a current location of a vehicle under the operation of the controller 160. The imaging device 120, also operated by the controller 160, may be configured to acquire image data of a road to which the vehicle is currently directed. The input unit 130 may be configured to receive a signal for entrance to a vehicle automatic steering control mode from a driver. The input unit 130 may be formed as a key pad, a touch pad, a touch screen, or the like. When the input unit 130 is formed as a touch screen, the input unit 130 may also perform a function of the output unit 140. The output unit 140, operated by the controller 160, may be configured to output the image data acquired by the imaging device 120, provide the image data to the driver, and output a plurality of target points set for automatic steering. The storage unit 150, operated by the controller 160, may be configured to store map data received from a map server (not shown), extract map data that corresponds to a current location of a vehicle, and provide the map data to the controller 160 (e.g., the controller 160 may access the map data stored within the storage unit or memory).

The controller 160 may be configured to detect a curvature of a road that corresponds to the current location of the vehicle and detect a road type based on the curvature. The controller 160 may be configured to set a plurality of target points based on the detected road type and automatically adjust steering of the vehicle. In particular, the current road may be interpreted as including a road when the vehicle is positioned and a road to which the current road is connected and the vehicle is to be directed. Further, the controller 160 may be configured to enter (e.g., start) an automatic steering control mode of the vehicle based on the input of the input unit 130. After entering the automatic steering control mode, the controller 160 may be configured to detect the current location of the vehicle based on the signal received from the GPS 110. The controller 160 may be configured to extract the map data regarding the road that corresponds to the detected current location of the vehicle from the storage unit 150 or detect the curvature of the road from the map data regarding the road to which the vehicle is directed, acquired from the imaging device 120.

Furthermore, the controller 160 may be configured to recognize the current road as a curved road when the detect curvature of the road is equal to or greater than a preset threshold value and recognize the current road as a substantially straight road when detected curvature of the road is less than the threshold value. The controller 160 may be configured to set a central portion of the road where the vehicle drives, as a reference path.

When the current road is a curved road, the controller 160 may be configured to set an escape distance as a short-distance target point on the curved road and sets an escape point as a long-distance target point. The controller 160 may be configured to set the escape distance as the short-distance target point to a point near the reference path of the road (e.g., set the point almost at the reference path) where the vehicle drives and set the escape angle as the long-distance target point to a distant point on the reference path. In general, with regard to the curve road, the driver has a driving pattern of preferentially adjusting the vehicle to drive in the same direction as the road by matching the vehicle and a reference distance in a transverse direction based on a specific target point at a nearby point and adjusting an angle by which the vehicle deviates from a specific target point at a distant point on the reference road to maintain a position of the vehicle at a central portion while driving on the curved road.

On the other hand, when the current road is a substantially straight road, the controller 160 may be configured to set an escape point as a short-distance target point and an escape distance as a long-distance target point on the substantially straight road. The controller 160 may be configured to set the escape angle as the short-distance target point at a close point on the reference path of the road when the vehicle is driven and set the escape distance as the long-distance target point at a distant point on the reference path. In general, with regard to the substantially straight road, the driver has a driving pattern of preferentially adjusting an angle by which the vehicle deviates from a specific target point at a distant point on the reference road to maintain a position of the vehicle at a central portion while driving on the substantially straight road and adjusting the vehicle not to deviate from the road by matching the vehicle and a reference distance in a transverse direction based on a specific target point at a distant point. In particular, the escape distance may be a transverse direction distance between the vehicle and the reference distance and the escape angle may be an angle between directions of the vehicle and the reference path.

The controller 160 may be configured to apply a weight to the set escape angle and escape distance to calculate an output value and perform steering control on the vehicle using the calculated output value. Further, the controller 160 may be configured to set different escape points and escape distances and apply a driver driving pattern based on the road where the vehicle is driven is a curved road or a substantially straight road. Thus, the driver may not experience inconvenience with respect to vehicle driving in an automatic steering control mode of the vehicle. In addition, the controller 160 may be configured to set distances between two target points as the escape point and the escape distance to be about the same to continuously control automatic steering of the vehicle and to increase safety of vehicle driving.

Figure 2:
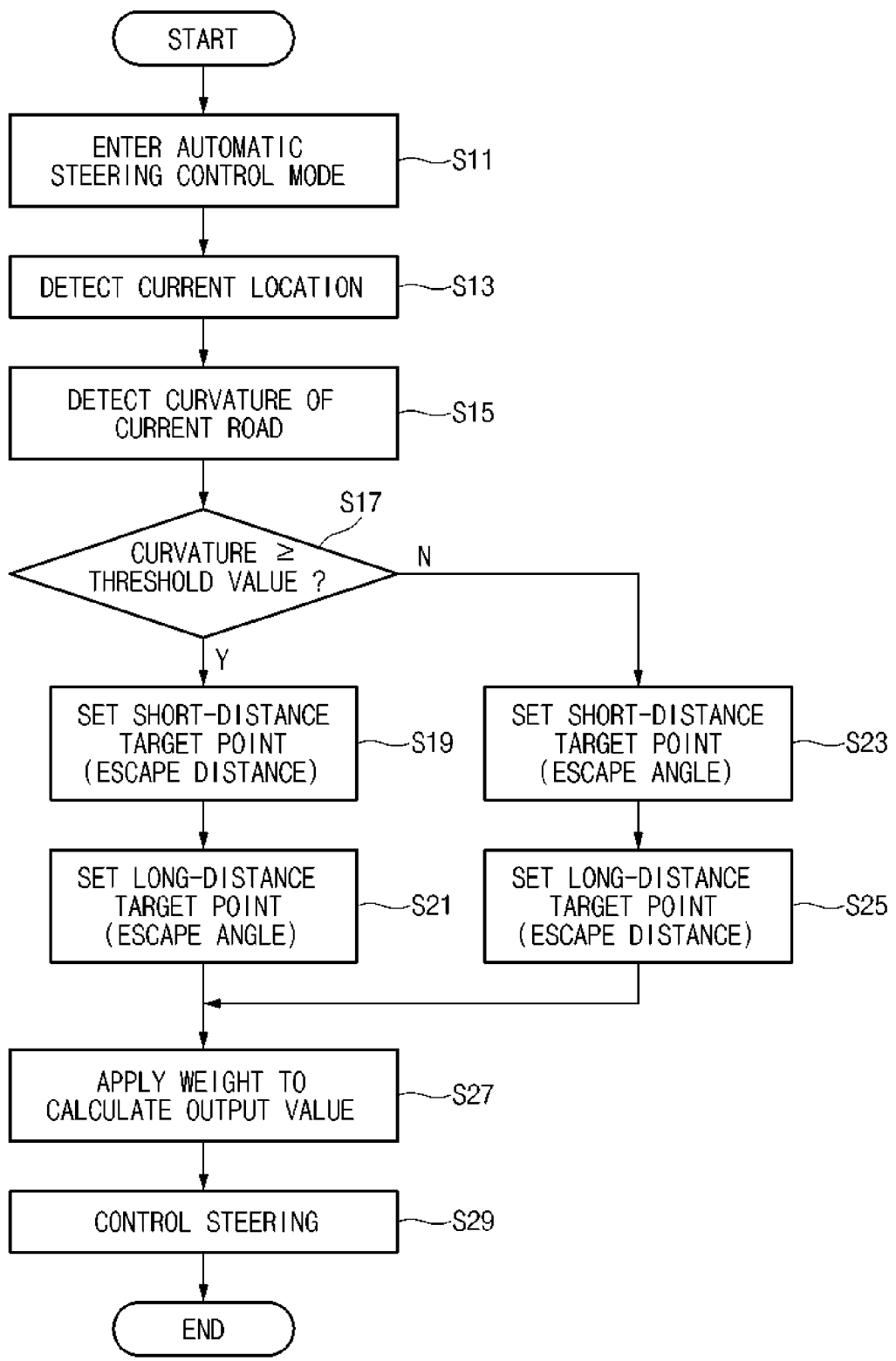
FIG. 2 is an exemplary flowchart of a method for controlling automatic steering of a vehicle according to an exemplary embodiment of the present invention.
Figure 3:
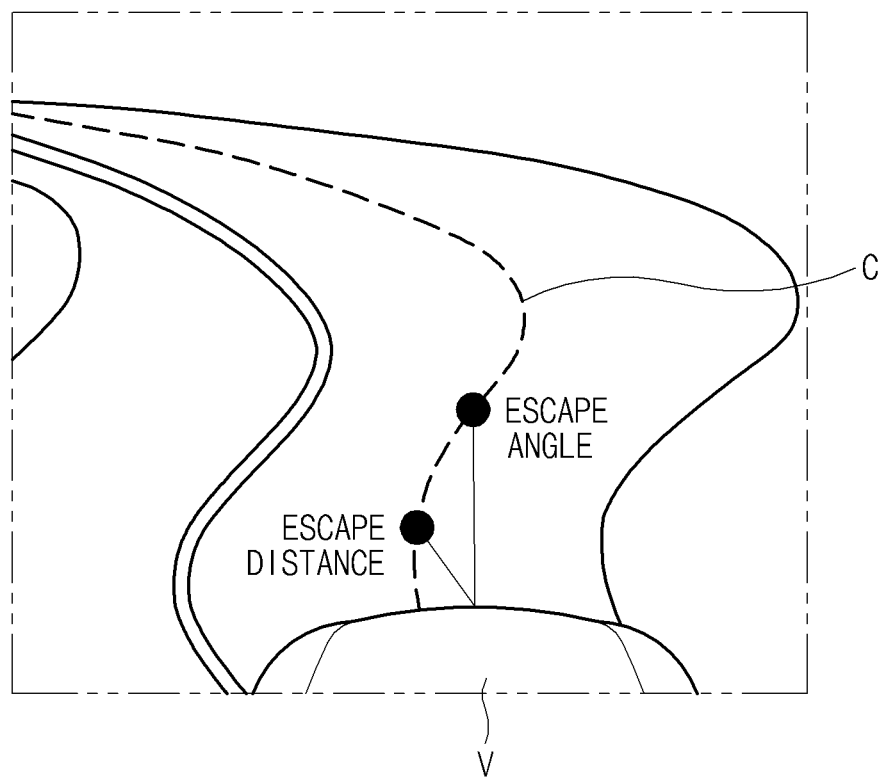
FIG. 3 is an exemplary diagram of an exemplary screen for explanation of control of steering of a vehicle that drives on a curved road according to an exemplary embodiment of the present invention.
Figure 4:
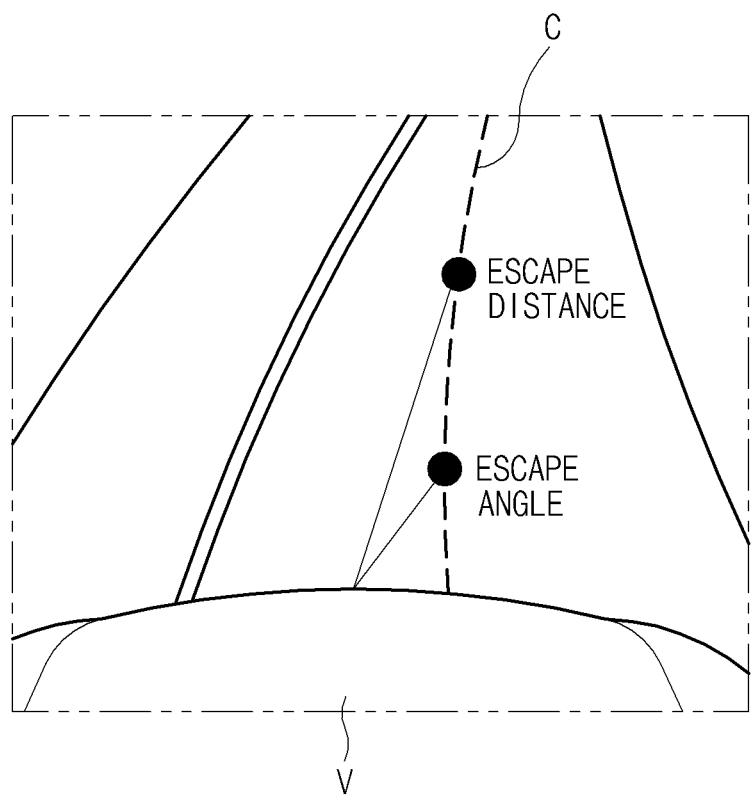
FIG. 4 is an exemplary diagram of an exemplary screen for explanation of control of steering of a vehicle that drives on a substantially straight road according to an exemplary embodiment of the present invention.

FIG. 2 is an exemplary flowchart of a method for controlling automatic steering of a vehicle according to an exemplary embodiment of the present invention. FIG. 3 is an exemplary diagram of an exemplary screen for explanation of control of steering of a vehicle that drives on a curved road according to an exemplary embodiment of the present invention. FIG. 4 is an exemplary diagram of an exemplary screen for explanation of control of steering of a vehicle that drives on a substantially straight road according to an exemplary embodiment of the present invention.

Referring to FIGS. 1 to 4, in operation S11, the controller 160 may be configured to enter a vehicle automatic steering control mode based on input of the input unit 130. In operation S13, the controller 160 may be configured to operate the GPS 110 to detect the current location of the vehicle and the method may proceed to operation S15. In operation S15, the controller 160 may be configured to detect a curvature of a road that corresponds to the current location of the vehicle, detected by the GPS 110. Accordingly, the controller 160 may be configured to extract the road of the current location from map data pre-stored in the storage unit 150 and calculate the curvature of the extracted road. In addition, the controller 160 may be configured to calculate the curvature of the road from image data of the road to which the vehicle is directed, acquired by the imaging device 120.

In operation S17, the controller 160 may be configured to recognize the current road as a curved road to proceed to operation S19 when the detected curvature of the road is equal to or greater than a preset threshold value and recognize the current road as a substantially straight road to proceed to operation S23 when the detected curvature of the road is less than the threshold value. In operation S19, the controller 160 may be configured to set the escape distance as a short-distance target point on a curved road. In operation S21, the controller 160 may be configured to set the escape angle as a long-distance target point on a curved road. This may be described with reference to FIG. 3. A vehicle V being driven on a curved road may be configured to set an escape distance at a close point (e.g., a point that is approximately at the reference path) on a reference path C in front of the vehicle as a short-distance target point and set an escape angle at a distant point on the reference path C as a long-distance target point.

In general, with regard to the curve road, the driver may have a driving pattern of preferentially adjusting the vehicle to drive in the same direction as the road by matching the vehicle and a reference distance in a transverse direction based on a specific target point at a close point and adjusting an angle by which the vehicle deviates from a specific target point at a distant point on the reference road to maintain a position of the vehicle at a substantially central portion while driving on the curved road. On the other hand, in operation S23, the controller 160 may be configured to set an escape angle as a short-distance target point on a substantially straight road. In operation S25, the controller 160 may be configured to set an escape distance as a long-distance target point on a substantially straight road. This may be described with reference to FIG. 4. The vehicle V driven on a substantially straight road may be configured to set an escape angle at a close point on the reference path C in front of the vehicle as a short-distance target point and set an escape distance at a distant point on the reference path C as a long-distance target point.

In general, with regard to the substantially straight road, the driver may have a driving pattern of preferentially adjusting an angle by which the vehicle deviates from a specific target point at a close point on the reference road to maintain a position of the vehicle at a substantially central portion while driving on the substantially straight road and adjusting the vehicle not to deviate from the road by matching the vehicle and a reference distance in a transverse direction based on a specific target point at a distant point.

The controller 160 may be configured to set different escape points and escape distances and apply a driver driving pattern based on the road when the vehicle is driven is a curved road or a substantially straight road. Thus, the driver may not experience inconvenience with respect to vehicle driving in a vehicle automatic steering control mode. In particular, the escape distance may refer to a transverse direction distance between the vehicle V and the reference distance C and the escape angle may refer to an angle between directions of the vehicle V and the reference path C. In operation S27, the controller 160 may be configured to apply a weight to the set escape angle and escape distance to calculate an output value. Further, the controller 160 may be configured to substitute the escape angle and escape distance set based on the road type to Equation 1 below.

$$\text{Output value} = W_1 P_1 + W_2 P_2 \quad \text{Equation 1}$$

In Equation 1 above, $W_1$ and $W_2$ may denote control weights of an escape distance and an escape angle and may be preset to correspond to a driving pattern of a driver. In Equation 1 above, $P_1$ denotes an escape angle of a straight road and an escape distance of a curved road, and $P_2$ denotes an escape distance of a straight road and an escape angle of a curved road.

Accordingly, when a driving road is a curved road, $W_1$ may be increased to increase a portion of the escape distance with respect to the output value and $W_2$ may be reduced to reduce a portion of the escape angle with respect to the output value. On the other hand, when the driving road is a substantially straight road, $W_1$ may be increased to increase a portion of the escape angle with respect to the output value and $W_2$ may be reduced to reduce a portion of the escape distance with respect to the output value. In addition, $W_1$ and $W_2$ may be differently or simultaneously adjusted based on driver pattern to calculate an output value.

Then, in operation S29, the controller 160 may be configured to adjust steering of the vehicle based on the output value calculated by applying a weight. Accordingly, the controller 160 may be configured to vary an escape distance and an escape angle based on a control weight to set portions of the escape distance and the escape angle, to reflect a driving pattern of a driver to automatic driving control.

According to the exemplary embodiment of the present invention, two target points may be set in a driving direction of a vehicle similar to a driving pattern of a driver while the vehicle is driven on a road to adjust automatic steering of the vehicle and thus to reduce inconvenience that the driver experiences during automatic steering. In addition, distances between two target points set in a driving direction may be set to be about the same to continuously control automatic steering of the vehicle and thus increase safety of vehicle driving.

It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. An automatic steering control apparatus of a vehicle, the apparatus comprising:
    a global positioning system (GPS) configured to detect a current location of the vehicle; and
    a controller having a memory with program instructions stored therein, the controller being configured to:
        detect a curvature of a road that corresponds to the current location of the vehicle;
        detect a road type based on the curvature;
        set two target points based on the road type, wherein the two target points include an escape angle and an escape distance;
        calculate an output value using the escape angle and the escape distance; and
        adjust steering of the vehicle based on the output value.

2. The apparatus according to claim 1, wherein the controller is configured to apply a preset weight to the escape angle and the escape distance to correspond to a driving state of the vehicle.

3. The apparatus according to claim 2, wherein the controller is configured to set the escape angle as a short-distance target point and the escape distance as a long-distance target point based on the vehicle when the road is a substantially straight road.

4. The apparatus according to claim 2, wherein the controller is configured to set the escape distance as a short-distance target point and the escape angle as a long-distance target point based on the vehicle when the road is a curved road.

5. A method for controlling automatic steering of a vehicle, the method comprising:
    entering, by a controller, an automatic steering control mode based on an input;
    detecting, by the controller, a current location of the vehicle;
    detecting, by the controller, a curvature of a road that corresponds to the current location to detect a road type;
    setting, by the controller, two target points based on the road type, wherein the two target points include an escape angle and an escape distance;
    calculating, by the controller, an output value using the escape angle and the escape distance; and
    adjusting, by the controller, steering of the vehicle based on the output value.

6. The method according to claim 5, wherein the detecting of the road type includes:
    detecting, by the controller, the road as a curved road when the curvature of the road is equal to or greater than a threshold value; and
    detecting, by the controller, the road as a substantially straight road when the curvature of the road is less than the threshold value.

7. The method according to claim 6, wherein the adjusting of the steering of the vehicle includes:
    adjusting, by the controller, the steering of the vehicle by applying a preset weight to an escape angle and an escape distance as the target points to correspond to a driving state of the vehicle.

8. The method according to claim 7, wherein the setting of the two target points includes:
    setting, by the controller, the escape angle as a short-distance target point and the escape distance as a long-distance target point based on the vehicle when the road is a substantially straight road; and
    setting, by the controller, the escape distance as a short-distance target point and the escape angle as a long-distance target point based on the vehicle when the road is a curved road.

9. A non-transitory computer readable medium containing program instructions executed by a controller, the computer readable medium comprising:
    program instructions that enter an automatic steering control mode based on an input;
    program instructions that control a global positioning system (GPS) to detect a current location of the vehicle;
    program instructions that detect a curvature of a road that corresponds to the current location to detect a road type;
    program instructions that set two target points based on the road type, wherein the two target points include an escape angle and an escape distance;
    program instructions that calculate an output value using the escape angle and the escape distance; and
    program instructions that adjust steering of the vehicle based on the output value.

10. The non-transitory computer readable medium of claim 9, wherein the detection of the road type further comprises:
    program instructions that detect the road as a curved road when the curvature of the road is equal to or greater than a threshold value; and
    program instructions that detect the road as a substantially straight road when the curvature of the road is less than the threshold value.

11. The non-transitory computer readable medium of claim 10, wherein the adjustment of the steering of the vehicle includes:
    program instructions that adjust the steering of the vehicle by applying a preset weight to an escape angle and an escape distance as the target points to correspond to a driving state of the vehicle.

12. The non-transitory computer readable medium of claim 11, wherein the setting of the two target points includes:
    program instructions that set the escape angle as a short-distance target point and the escape distance as a long-distance target point based on the vehicle when the road is a substantially straight road; and
    program instructions that set the escape distance as a short-distance target point and the escape angle as a long-distance target point based on the vehicle when the road is a curved road.

* * * * *